E. W. MYERS.
CHANGE SPEED TRANSMISSION MECHANISM FOR MOTOR CYCLES.
APPLICATION FILED MAR. 14, 1912.

1,060,999.

Patented May 6, 1913.
3 SHEETS—SHEET 3.

UNITED STATES PATENT OFFICE.

EDGAR W. MYERS, OF SAN JOSE, CALIFORNIA, ASSIGNOR, BY DIRECT AND MESNE ASSIGNMENTS, TO RUDOLPH-MYERS MANUFACTURING CO., A CORPORATION OF CALIFORNIA.

CHANGE-SPEED-TRANSMISSION MECHANISM FOR MOTOR-CYCLES.

1,060,999.    Specification of Letters Patent.    Patented May 6, 1913.

Application filed March 14, 1912. Serial No. 683,725.

*To all whom it may concern:*

Be it known that I, EDGAR W. MYERS, a citizen of the United States, residing at San Jose, in the county of Santa Clara and State of California, have invented new and useful Improvements in Change-Speed-Transmission Mechanism for Motor-Cycles, of which the following is a specification.

This invention relates to a variable speed transmission mechanism especially adapted for belt transmission on motorcycles, constructed so as to be capable of transmitting the maximum power of the engine when this is directly or indirectly connected with the transmission mechanism without slip or loss.

It is an object of the invention to produce a simple, substantial design with as few operating parts as possible, to produce silent operation, and to provide it with suitable adjustments so that a certain amount of wear between the surfaces can be compensated for without renewal of parts.

The invention consists of the parts and the construction and combination of parts as hereinafter more fully described and claimed, having reference to the accompanying drawings, in which—

Figure 1:
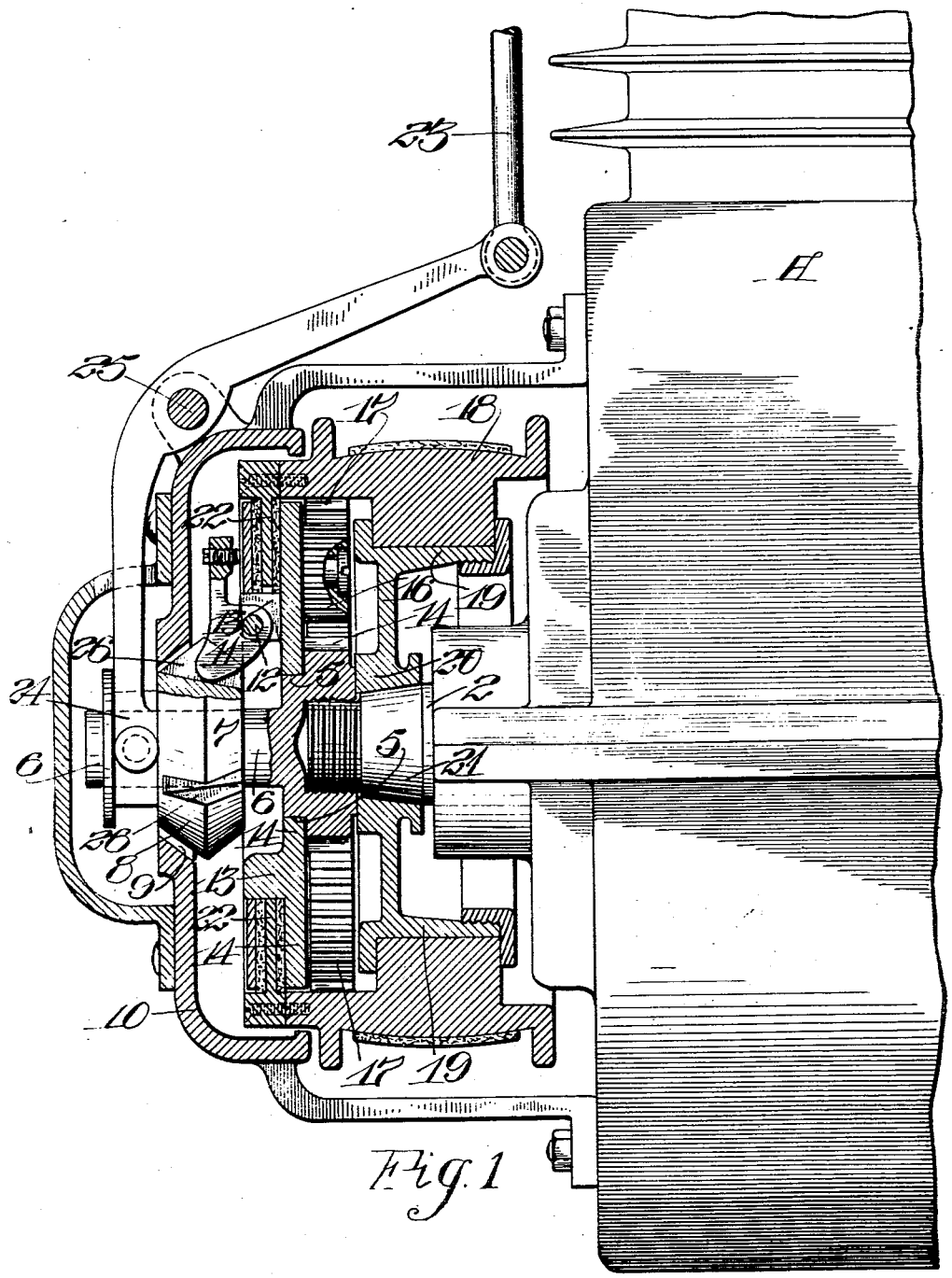
Figure 2:
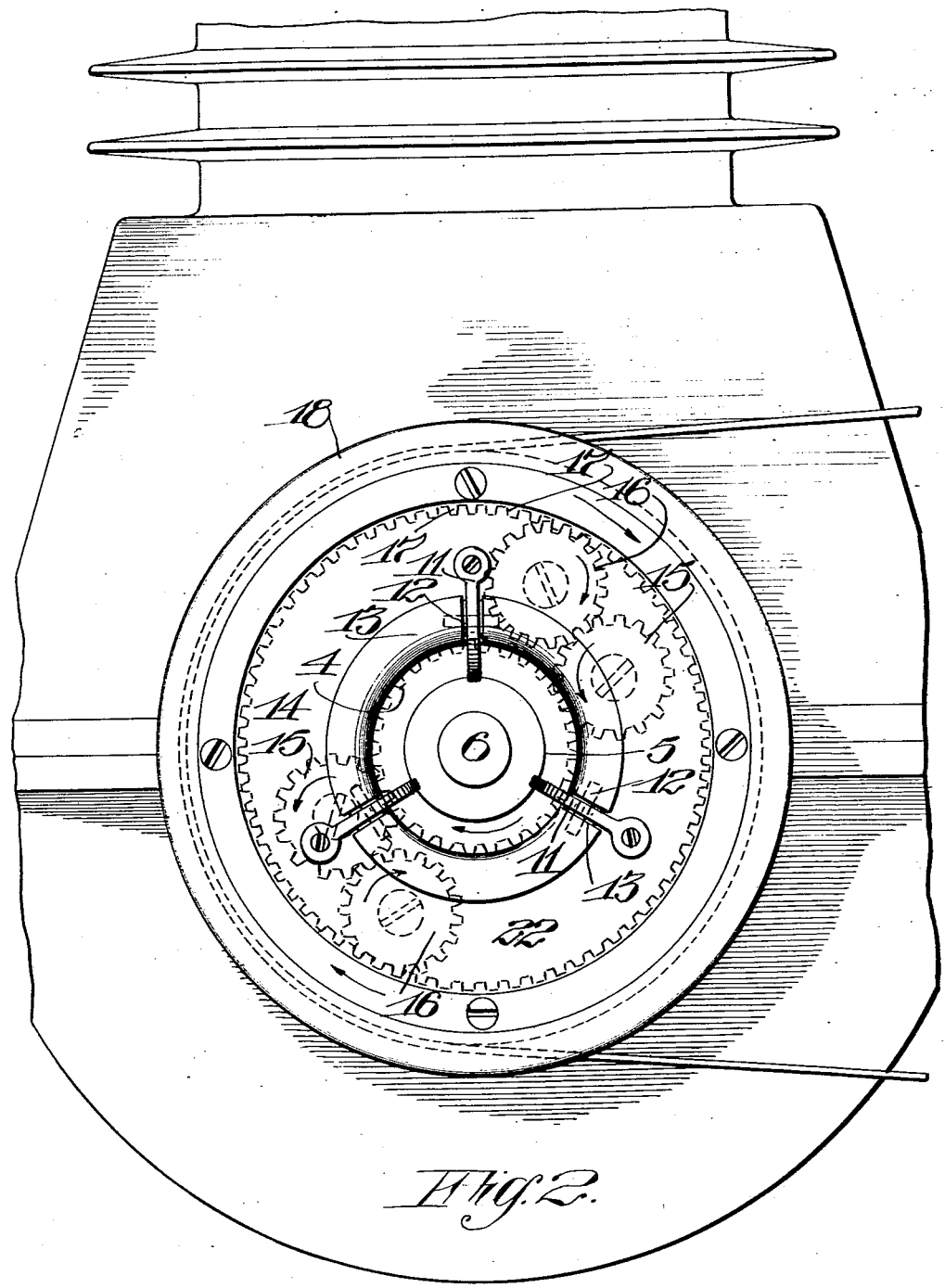
Figure 5:
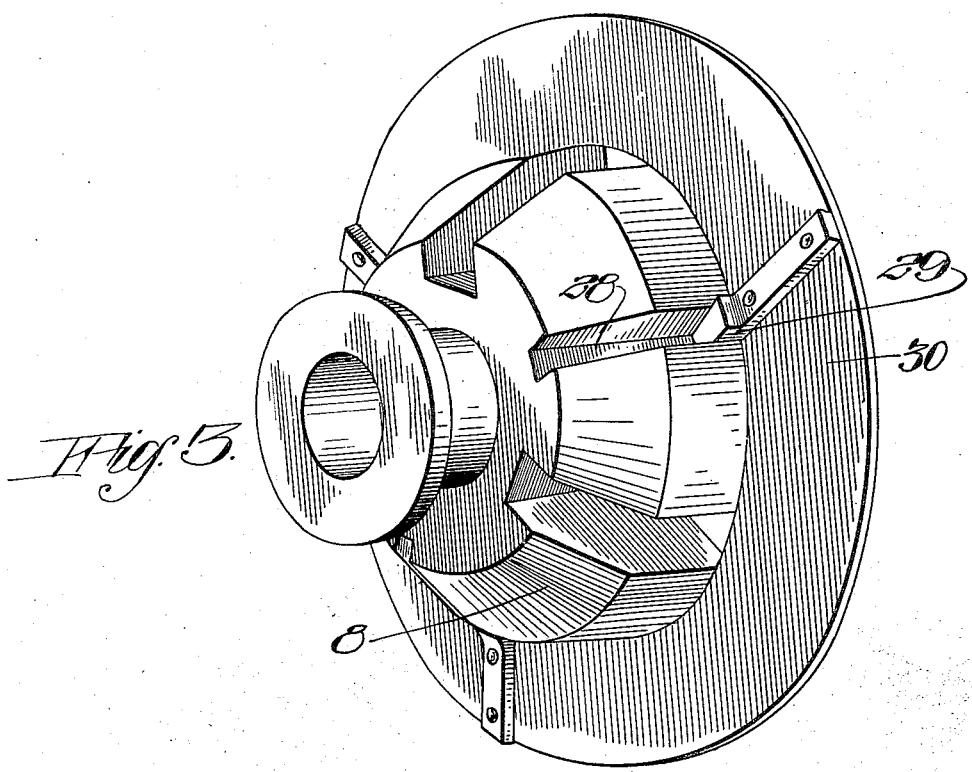

Figure 1 is a vertical, longitudinal section of the transmission mechanism attached to the engine. Fig. 2 is a front view showing the housing removed. Fig. 3 shows a modification of the friction cone.

Referring to Fig. 1 of the drawings, A represents an engine having a crank-shaft 2, one end of which carries a driving pinion 4 having an annular shoulder 5 and an extension 6 on which is slidable a cone 7, having a tapered friction face 8 adapted to engage with a coacting surface 9 in a stationary housing 10 secured to the engine casing in any suitable manner. Engageable with the cone 7 is a suitable number of dogs 11, pivoted at 12 in an annular shoulder 13 projecting from a plate 14 which is seated on the shoulder 5 of the driving pinion. Mounted on the plate 14 are two pairs of intermediate gears 15—15 and 16—16. As shown in Fig. 2, one meshes with the driving pinion and the other with an internal gear 17 on the transmission pulley 18 mounted and turnable about an intermediate bearing 19, having a hub portion 20 secured to a tapered portion 21 of the shaft. On the outer face of the transmission pulley 18 is secured a multiple disk clutch 22, of the usual construction, engageable with the intermediate gear-carrying plate 14 so that the transmission pulley and intermediate gear-carrying plate may be locked, which takes place when a direct drive is desired.

The operation of the device will be as follows: When a direct engine drive is desired, the cone 7 is forced inwardly by an upward pull on a rod 23, connected to a forked cone-shifting lever 24 pivoted, as at 25, on the housing. This inward movement of the cone expands the dogs, which in turn compress the disks in the clutch, causing these to engage and lock the different revolving parts, as the transmission pulley and the intermediate gear-carrying plate. The moment this takes place the gear transmission mechanism will also become interlocked and the whole structure will revolve as one unit with the engine shaft. When a two to one drive or half speed is desired, the cone is shifted in the opposite direction until the friction face 8 of the cone engages with the coacting, stationary face of the housing, bringing the cone to a stop and locking it to the housing, which in turn locks the plate 14; the clutch dogs forming a lock between the two being pivoted to the plate in one place and guided in slots 26 in the cone thus forming a rigid lock between the two. The moment plate 14 becomes locked, the driving pinion will begin to transmit motion through the intermediate gears 15—15 and 16—16 to the internal gear 17, revolving this at a speed proportionate to the gear rotation, (generally two revolutions of the engine shaft to one of the pulley). However this rotation may be changed to suit conditions. It will be understood that in place of a belt pulley I may use any other suitable form of transmission mechanism as a gear or sprocket wheel or any other suitable form which may prove desirable.

In Fig. 3 of the drawings I have shown a modification of the friction cone. Here the cone is provided with a number of grooves 28 adapted to receive projections 29 secured to the outside disk 30 of the multiple disk clutch, locking the two together without preventing the endwise sliding movement of the disk. By having the disk and cone interlocked it will be impossible for the disk to revolve independently of the cone, thus insuring a positive contact between the dogs and the disk. If the disk and cone were separated and independent of each other, it would only be a matter of time before the dogs would cut deep grooves in the disk when taking hold to throw in the multiple disk clutch and destroy the disk.

Having thus described my invention, what I claim and desire to secure by Letters Patent is—

1. A variable speed transmission gearing for motorcycles, including a crank-shaft, a pinion carried thereby, a plate or disk turnable upon a hub or shoulder of said pinion and having dogs fulcrumed thereto, a slidable cone upon the outer end of the hub, a stationary housing with which the cone is engageable, a transmission pulley and a multiple disk clutch carried thereby, an internal gear in the pulley, and intermediate pinions engaging said gear and the crank-shaft pinion.

2. A variable speed transmission gearing for motorcycles, consisting of an engine crank-shaft, a pinion at the end of the shaft, a bearing upon the shaft, a transmission pulley turnable upon the bearing and having an internal gear, pinions between and engaging said gear and the crank-shaft pinion, a shaft in line with the crank-shaft, a cone slidable on said shaft, having a frictional surface, a housing with a frictional surface with which that of the cone is engageable, a multiple disk clutch upon the side of the transmission pulley, a disk turnable upon the hub of the crank-shaft pinion, having cam dogs fulcrumed thereto, with one end adapted to press against the clutch disks, and the other engageable by the sliding cone, and a manually operated lever by which the cone is shifted to engage the housing or the cones.

3. A variable speed transmission gearing for motorcycles, comprising an engine crank shaft, a pinion thereon, a transmission pulley loosely mounted concentric with the shaft, an extension in line with the shaft, a cone slidably mounted upon said extension, a stationary housing having a surface to be engaged by the cone, a clutch member carried by the pulley, an internal gear in the pulley, intermediate pinions engaging said gear and the first-named pinion, and a disk within the pulley having cam dogs with one part adapted to be engaged by the sliding cone and another part adapted to press against said clutch member.

In testimony whereof I have hereunto set my hand in the presence of two subscribing witnesses.

EDGAR W. MYERS.

Witnesses:
GENEVIEVE S. DONELIN,
JOHN H. HERRING.